United States Patent
Hamann et al.

(10) Patent No.: US 7,766,300 B2
(45) Date of Patent: Aug. 3, 2010

(54) MACHINE WITH SUPPORT ELEMENTS

(75) Inventors: Jens Hamann, Fürth (DE); Hans-Peter Tröndle, Forchheim (DE); Bernd Wedel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 950 days.

(21) Appl. No.: 11/568,060

(22) PCT Filed: Apr. 20, 2005

(86) PCT No.: PCT/EP2005/051758

§ 371 (c)(1),
(2), (4) Date: Oct. 18, 2006

(87) PCT Pub. No.: WO2005/105366

PCT Pub. Date: Nov. 10, 2005

(65) Prior Publication Data
US 2009/0218473 A1    Sep. 3, 2009

(30) Foreign Application Priority Data
Apr. 27, 2004   (DE) .................. 10 2004 020 578

(51) Int. Cl.
*F16M 3/00* (2006.01)
(52) U.S. Cl. .................. 248/677; 248/637; 248/638
(58) Field of Classification Search .............. 248/677, 248/637, 638, 654, 658, 659, 672
See application file for complete search history.

(56) References Cited

U.S. PATENT DOCUMENTS

| 3,794,277 | A | | 2/1974 | Smedley et al. |
| 3,921,039 | A | * | 11/1975 | Robinson et al. ............ 361/830 |
| 4,576,357 | A | | 3/1986 | Schrepfer |
| 6,015,131 | A | * | 1/2000 | Brewer, III .................. 248/638 |
| 6,805,337 | B1 | * | 10/2004 | Rastegar et al. ............. 267/136 |
| 2009/0126319 | A1 | * | 5/2009 | Sperry et al. .................. 53/433 |

FOREIGN PATENT DOCUMENTS

| CH | 633 873 A5 | 12/1982 |
| JP | 5335198 A | 12/1993 |
| JP | 2002257191 A | 9/2002 |

\* cited by examiner

*Primary Examiner*—Ramon O Ramirez
(74) *Attorney, Agent, or Firm*—Henry M. Feiereisen; Ursula B. Day

(57) ABSTRACT

The invention relates to a machine, whereby at least one machine bed (2) of the machine is linked to a floor (1), by means of at least one support element (9a), said support element (9a) being pivotally mounted in relation to the machine bed (2) and the floor (1). The invention also relates to a support element (9a), for bearing a machine, whereby said support element (9a) comprises means (10a), by which the support element is pivotally linked to the machine and means (11a), by which said element is pivotally linked to the floor (1). The invention thus avoids horizontal movements of the machine bed.

14 Claims, 4 Drawing Sheets

MACHINE WITH SUPPORT ELEMENTS

BACKGROUND OF THE INVENTION

The invention relates to a machine.

The invention furthermore relates to a support element for bearing the machine.

The quality of machines, such as machine tools, production machines or robots, is severely impaired by disturbances, which can be introduced by way of vibrations in the floor on which the machine is standing, which may take the form of a shed floor or a platform. The disturbances are caused for example by forklift trucks, presses or other machines which cause the floor to vibrate and consequently have an adverse effect on the quality of manufacture. It is therefore conventional in a commercial context for the machines to be set on mounting elements on the floor and consequently for the machines to be separated from the floor.

FIG. 1 shows, in the form of an example embodiment, a commercially available setting-up of this kind, for a machine tool. The two-axis machine that is illustrated in the example embodiment includes a machine bed 2 and a first machine axis in the form of a carriage 7 which, by means of a drive, is movable to and fro in the horizontal direction, in the direction of the double-headed arrow 3, with the aid of guides. Mounted on the carriage 7 is a workpiece 5. A second machine axis takes the form of a spindle 14 which may be moved vertically to and fro, the possibility of vertical movement being indicated by an arrow 4 and being imparted to a tool 6 for machining the workpiece 5. The machine is set up on a floor 1 by way of three mounting elements 8a, 8b and 8c which have a resilient effect.

FIG. 2 shows a view of the machine bed 2 and the mounting elements 8a, 8b and 8c in a view from below.

Vertical movements of the floor 1, which are indicated by an arrow 12, as a result for example of a forklift truck driving past, are properly separated from the machine, and in particular the machine bed 2, by the mounting elements 8a, 8b and 8c.

As a result of the movements of the carriage 7, which are frequently rapid and jerky, a force that acts in the opposite direction acts on the machine bed 2 in the horizontal direction, causing a horizontal movement of the machine bed 2, which is indicated in FIG. 1 by an arrow 15. A horizontal movement of the carriage 7 consequently results in a horizontal vibrational movement 15 of the machine bed 2, which impairs the quality of production and the possible rate of production. The mounting elements that are used are, as already mentioned above, well suited to separating the machine bed 2 from vertical movements 12 of the floor 1 but have very little horizontal rigidity, by comparison with their vertical rigidity. Horizontal movements 12 of the machine bed 2 may thus be produced relatively easily, as a result of the inadequate horizontal rigidity of the mounting elements, and these very severely limit the dynamic performance of the machine, since they are movements of very low-frequency natural oscillation.

For this reason, when there was a requirement hitherto to avoid both vertical movements 12 and horizontal movements 15 of the machine bed, in such cases the machine was hitherto connected as rigidly as possible to a very large, heavy platform. In such cases, the mounting elements were hitherto constructed for example as tie rods of extremely high rigidity. As a result of the large weight of the platform, the latter is largely insensitive to external disturbance factors such as forklift trucks or neighboring machinery, with the result that only very small vertical movements of the floor occur. As a result of the high rigidity of these special mounting elements, horizontal movements of the machine bed are prevented to a large extent.

However, the large, heavy platform that is required for this solution has the disadvantage on the one hand that it is very expensive and on the other that there is a requirement nowadays for machines to be movable quickly. Furthermore, a large platform of this kind also takes up a considerable amount of space.

SUMMARY OF THE INVENTION

The object of the invention is to set up a machine on a floor such that horizontal movements of the machine bed are avoided.

The stated object is achieved in accordance with the invention in that at least one machine bed of the machine is connected to a floor by means of at least one support element, the support element being borne such that it is rotatable in relation to the machine bed and the floor.

Furthermore, the object is achieved by a support element for bearing a machine, the support element having means in order to be rotatably connected to the machine and means in order to be rotatably connected to the floor.

Advantageous embodiments of the invention are apparent from the subclaims.

An essential advantage of the invention consists in the fact that there is no longer any need for a large platform and/or special, particularly rigid, mounting elements in order to avoid vertical and horizontal movements of the machine bed.

A first advantageous embodiment of the invention is characterized in that the support element is constructed in the form of rods. A construction of the support element in the form of a rod can be produced at particularly low cost.

It has furthermore proved advantageous for the support element and at least one further support element to be arranged on opposing sides of the machine bed. When the support elements are arranged on respectively opposing sides of the machine bed, particularly good suppression of horizontal movements of the machine is achieved.

Moreover, it has proved advantageous for at least two support elements to be together arranged in the form of a cross on at least one side of the machine bed. As a result of a cross-shaped arrangement of the support elements, a particularly space-saving construction of the invention is made possible.

In this context, it has proved advantageous for the cross-shaped arrangement of the support elements to be in each case produced on opposing sides of the machine bed. When the rods are arranged on respectively opposing sides of the machine bed, particularly good suppression of horizontal movements of the machine is achieved.

A further advantageous embodiment of the invention is characterized in that the support element is arranged along a side of the machine bed. This makes a space-saving construction of the invention possible.

Moreover, it has proved advantageous for the support element to be arranged within the machine bed. This makes a particularly space-saving construction of the invention possible.

Moreover, it has proved advantageous for the support element to be rotatably connected to the machine bed on the machine side close to a corner of the machine bed, since a particularly good supporting action of the support element can be achieved there.

BRIEF DESCRIPTION OF THE DRAWING

Three example embodiments of the invention are illustrated in the drawing and are explained in more detail below. In the drawing.

DETAILED DESCRIPTION OF PREFERRED EMBODIMENTS

Figure 1:
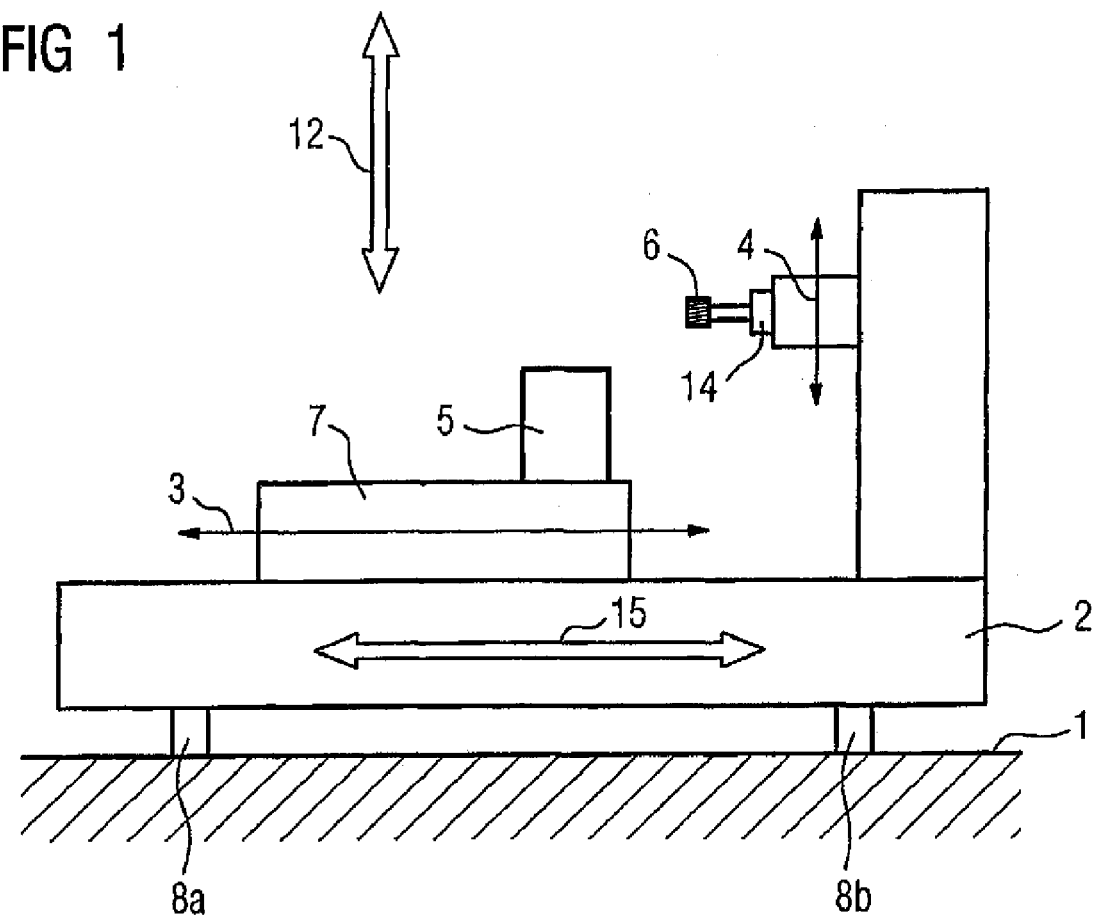
FIG. 1 shows a machine tool.
Figure 2:
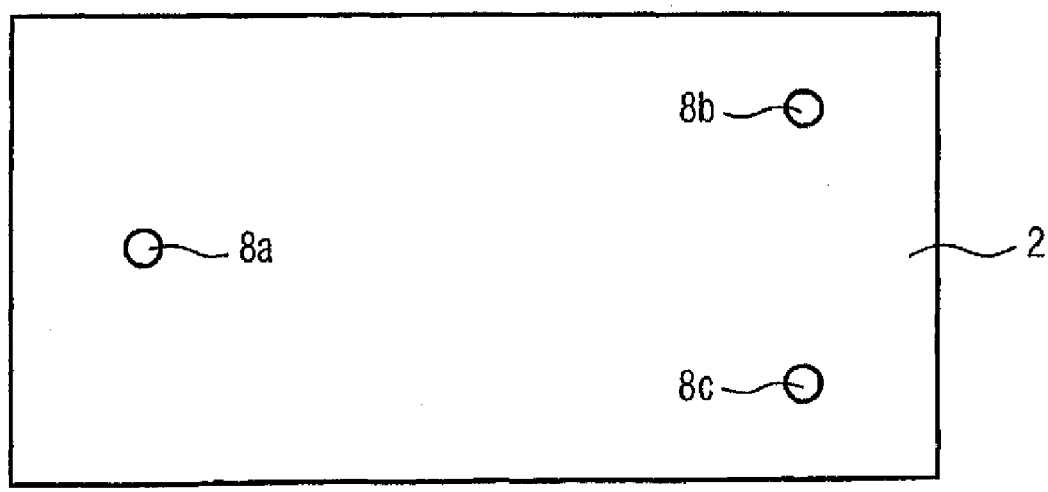
FIG. 2 shows a machine bed, viewed from underneath, of the machine.
Figure 3:
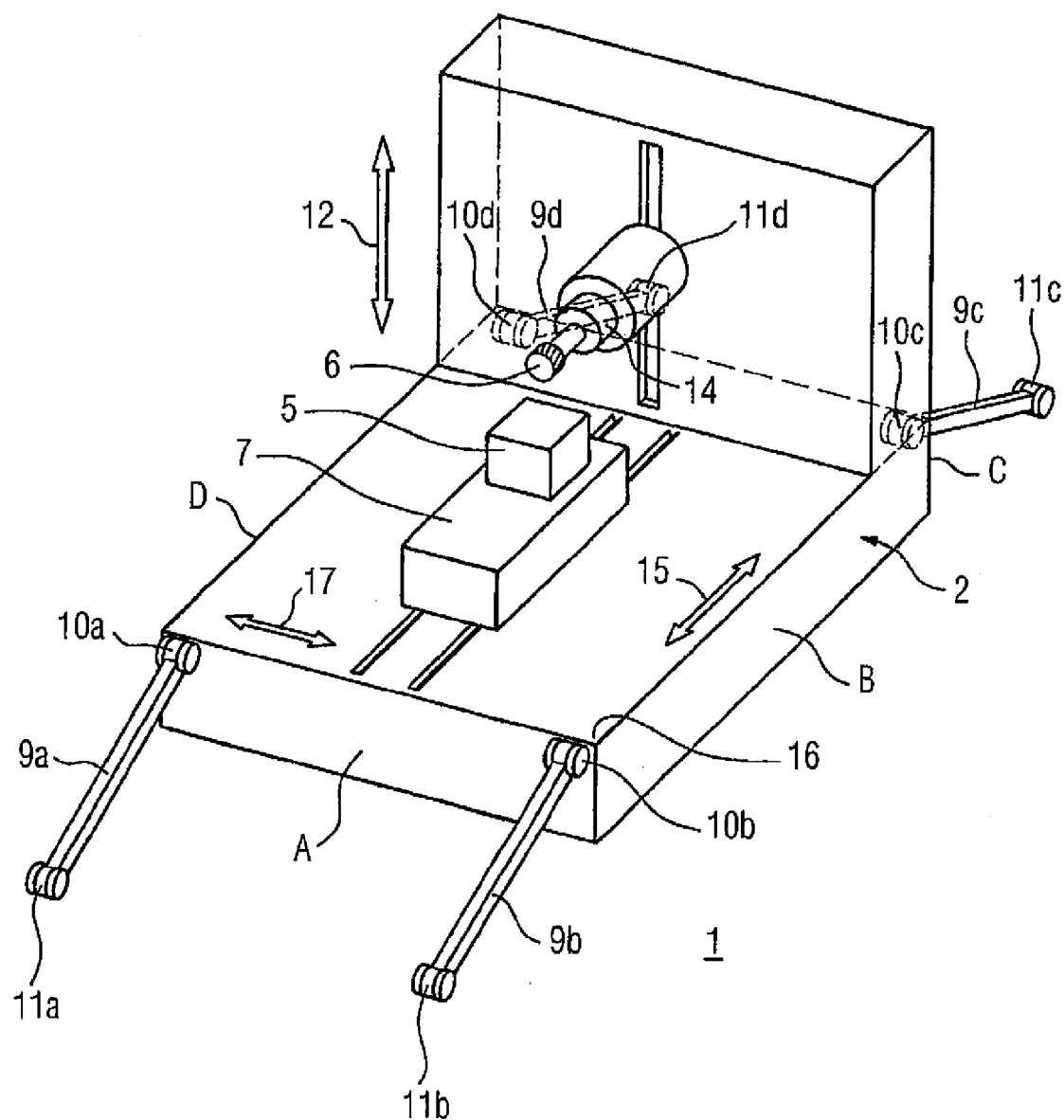
FIG. 3 shows a machine tool according to the invention, having support elements in accordance with a first example embodiment.

In FIG. 3, a machine tool according to the invention is illustrated diagrammatically in the form of a perspective view. The embodiment illustrated in FIG. 3 corresponds substantially to the commercially available embodiment described above in accordance with FIG. 1 and FIG. 2. For this reason, the elements are given the same reference numerals in FIG. 3 as in FIG. 1. The embodiment according to the invention in accordance with FIG. 3 is also set up on resilient mounting elements 8a, 8b and 8c in accordance with FIG. 1 and FIG. 2, but they are not expressly illustrated in FIG. 3. The four sides of the machine bed 2 in accordance with FIG. 3 are labeled A, B, C and D, with the side C, which is opposite the side A, and the side D, which is opposite the side B, not visible because of the perspective illustration. The essential difference between the machine tool according to the invention, in accordance with FIG. 3, and the machine tool in accordance with FIG. 1 is that in the embodiment according to FIG. 3 the machine bed 2 of the machine is additionally connected by means of elongate support elements 9a, 9b, 9c and 9d to a floor 1, with the support elements 9a, 9b, 9c and 9d borne such that they are rotatable in relation to the machine bed 2 and the floor 1 with the aid of bearings 10a, 10b, 10c, 10d, 11a, 11b, 11c and 11d. The support elements in the example embodiment are constructed in the form of rods which may be made of metal or a carbon composite material. As a result of the length of the rods, they have a resilient action. Rods of this kind have the advantage that they can be produced at particularly low cost. Alternatively, it goes without saying that hydraulic elements or a structure in the form of springs are also conceivable as the support elements.

The support elements 9a, 9b, 9c and 9d according to the invention have virtually no effect on the properties of the resilient mounting elements providing separation, with the result that vertical movements, in particular vibrations of the floor, can be kept away from the machine and in particular the machine bed by the conventional mounting elements without using a large platform or particularly rigid mounting elements. The horizontal vibrations in the direction of the double-headed arrow 15 are greatly reduced in amplitude by the support elements, and at the same time the extremely low natural frequency of the machine in the horizontal direction is raised to a marked extent, for example from 14 Hz to 20 Hz. The increase in the extremely low natural frequency of the machine in the horizontal direction in accordance with the arrow 15, which is generated in addition to suppressing the horizontal vibrations, allows the dynamic performance of the machine to be increased to a marked extent, since as a result of the higher natural frequency it is also possible to make the means of controlling the horizontal movement of the carriage 7 more dynamic. The controller gain can thus be increased. This advantage brings about faster production times and hence low costs.

In the example embodiment, a total of four support elements 9a, 9b, 9c and 9d are provided. In each case two support elements are arranged on two opposing sides A and C of the machine bed 2 in the example embodiment, in order to achieve optimum effect. It goes without saying that it is also conceivable to mount the support elements on only one side, for example A.

Moreover, it goes without saying that it is also conceivable to mount more than two support elements on each side of the machine bed 2. In addition to the support elements which in the example embodiment are mounted on side A and side C of the machine bed 2, it goes without saying that it is also possible to mount support elements on the sides B and D of the machine element 2 in the same way. This is particularly necessary if the machine has a further machine axis which makes possible, for example, a horizontal movement of the workpiece 5 that is guided in a direction of movement 17 in accordance with FIG. 3, which runs along the horizontal, offset by 90° in relation to the direction of movement 15.

Figure 4:
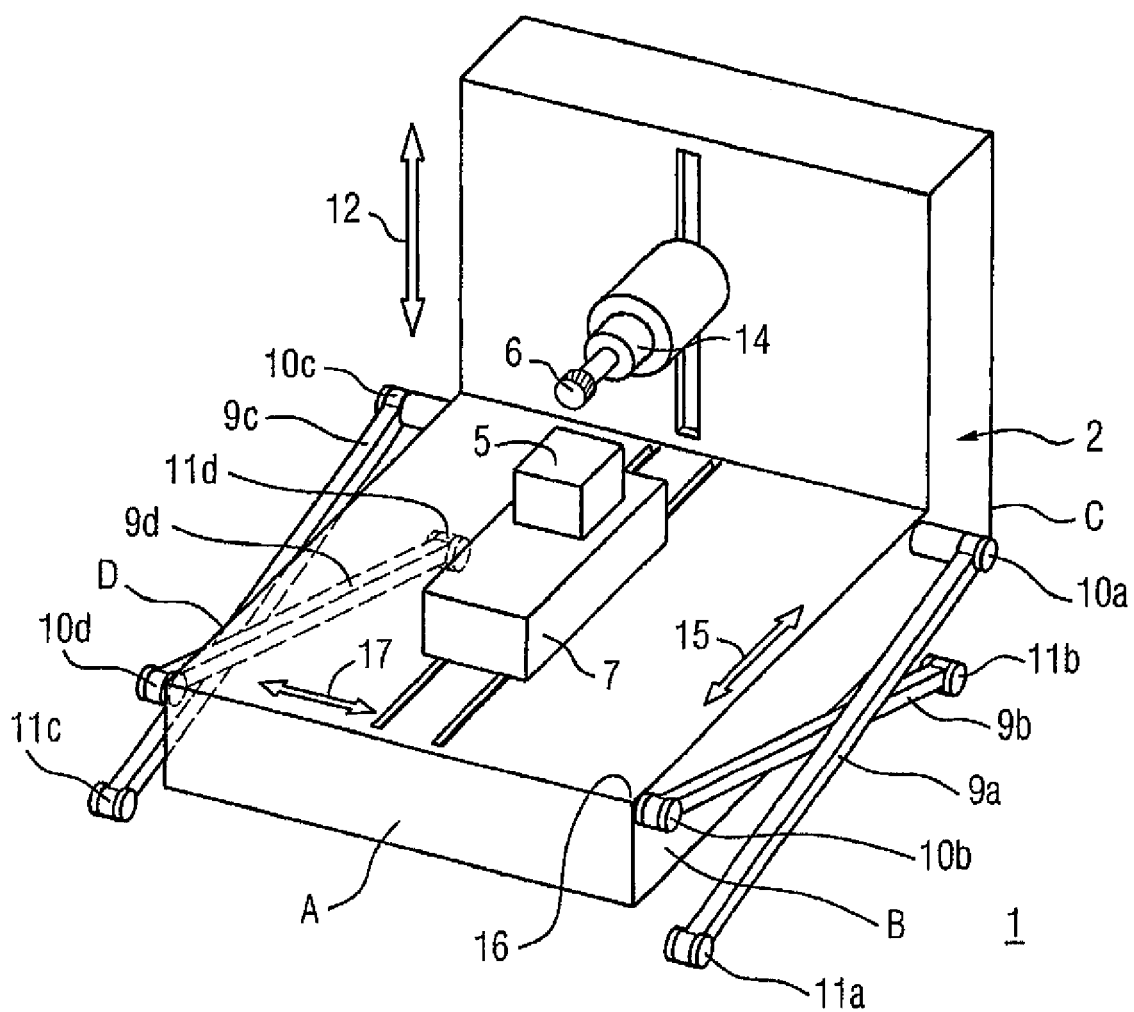
FIG. 4 shows a second example embodiment of the invention.

FIG. 4 illustrates a further embodiment of the invention. This corresponds substantially to the embodiment that is described above in FIG. 3. For this reason, like elements are given the same reference numerals in FIG. 4 as in FIG. 3. The essential difference between the embodiment in accordance with FIG. 4 and the embodiment in accordance with FIG. 3 is that in the embodiment in accordance with FIG. 4 the support elements 9a, 9b, 9c, 9d are together arranged in the form of a cross. Because horizontal vibrations of the machine bed—in the horizontal direction in accordance with the double-headed arrow 15—are to be suppressed, moreover, in contrast to FIG. 3, the support elements are no longer mounted on the sides A and C but on the sides B and D, with the support elements, unlike the embodiment that is shown in FIG. 3, no longer laid away from the machine bed but preferably running along the machine bed along the sides B and D. In the example embodiment, the support elements are guided parallel to the relevant side of the machine bed 2, the side on which they are mounted. Alternatively, it is also conceivable for example to mount the bearing 11a and 11b of the support elements 9a and 9b further away from the side B of the machine bed 2 and consequently also to make the machine and in particular the machine bed 2 more rigid in a manner acting in the same direction as the direction of movement 17. The embodiment of the invention in accordance with FIG. 4 has, by comparison with the embodiment of the invention in accordance with FIG. 3, the great advantage of taking up markedly less space.

Figure 5:
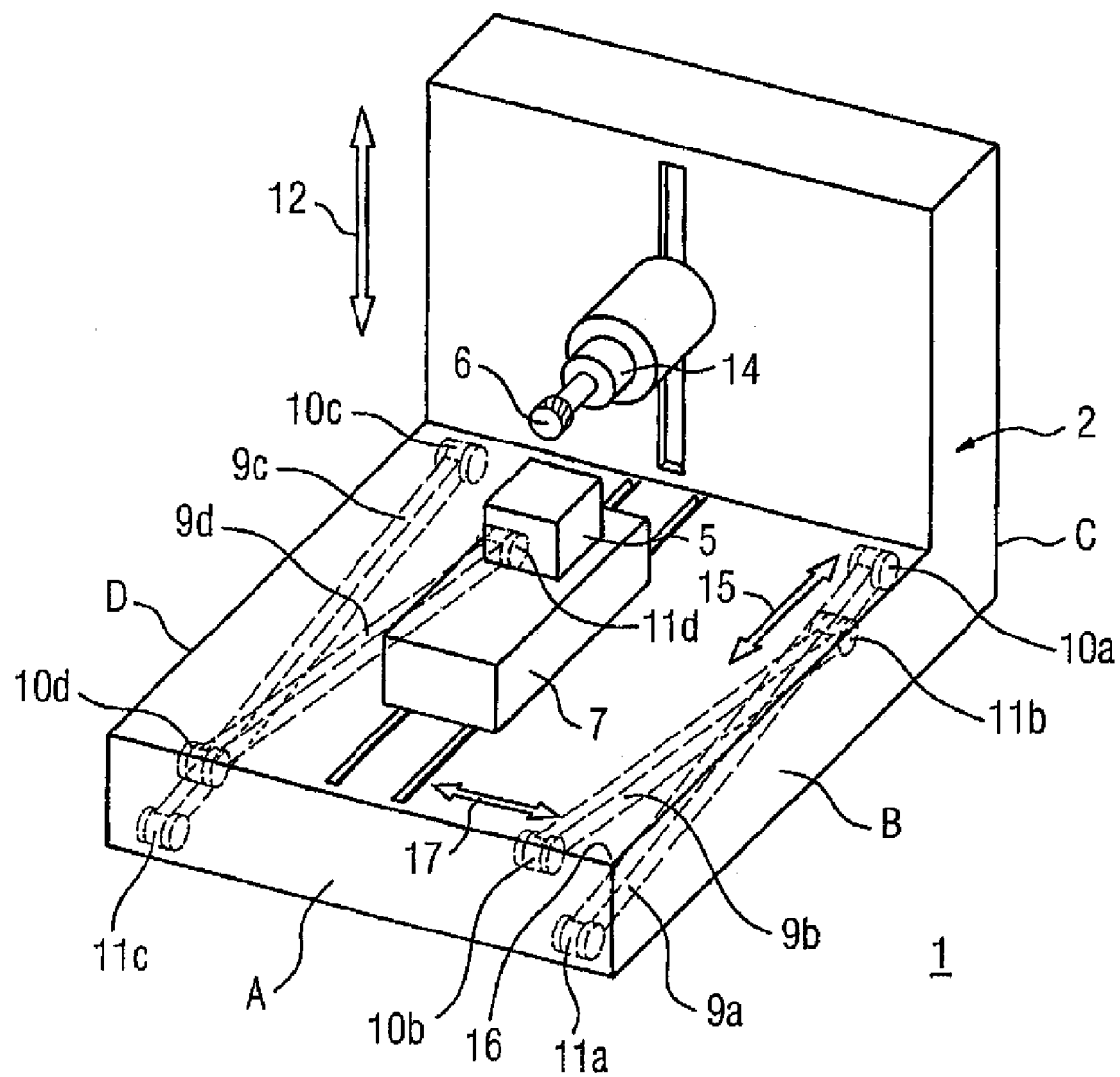
FIG. 5 shows a third example embodiment of the invention.

FIG. 5 illustrates a further embodiment of the invention. This corresponds substantially to the embodiment that is described above in FIG. 4. For this reason, like elements are given the same reference numerals in FIG. 5 as in FIG. 4. The embodiment in accordance with FIG. 5 has the same function as the embodiment in accordance with FIG. 3 and FIG. 4. The only essential difference between the embodiment in accordance with FIG. 5 and the embodiment in accordance with FIG. 4 is that the support elements 9a, 9b, 9c and 9d are arranged within the machine bed 2. This has the advantage of a particularly space-saving construction. In this case, the support elements may be accommodated for example within a corresponding recess or groove in the machine bed 2.

It goes without saying that in the embodiment in accordance with FIG. 3 and the embodiments in accordance with FIG. 4 and FIG. 5 it is also possible for the cross-shaped arrangement to be arranged on only one side of the machine bed 2 or for, in an extreme case, only a single support element, for example the support element 9a in accordance with FIG. 4, to be provided and for example to be arranged along a side of the machine bed. In order to achieve optimum effect, however, it is useful to arrange the support elements on opposing sides.

It goes without saying that it is also conceivable for only a single support element to be provided in the embodiment in accordance with FIG. 5.

Moreover, it is also conceivable to use on one side of the machine bed more than the two support elements illustrated in the example embodiments on each side.

The more support elements there are used, the more rigid the arrangement becomes.

In the embodiments in accordance with FIG. 3, FIG. 4 and FIG. 5, the machine bed has a plurality of corners, with only one corner 16 being provided with a reference numeral in each figure, for the sake of clarity. In order to achieve optimum effect, it is useful to mount the support rods 3 on the machine side close to the corners of the machine bed 2.

It goes without saying that combinations of support elements which are arranged within the machine bed 2 and support elements which are arranged outside the machine bed 2, and combinations comprising the arrangement of the support elements along a side of the machine bed 2, in accordance with FIG. 4, and directed away from the machine bed 2, in accordance with FIG. 3, are also possible.

In this case, the support elements have means of being rotatably connected to the machine and means of being rotatably connected to the floor.

The means are in this case, in the example embodiments, produced as rotatable bearings 10a, 10b, 10c, 10d, 11a, 11b, 11c and 11d. The bearings may for example, as in the example embodiments, be produced only in the form of simple bearings which are rotatable only in one direction, or indeed in the form of universal joint suspensions.

It goes without saying that, for example in the case of a large machine which has a plurality of machine beds, it is possible for not only one machine bed but a plurality of machine beds of the machine to be connected to the floor by means of the support elements according to the invention.

What is claimed is:

1. A machine comprising:
   at least one machine bed;
   at least one support element for connection of the machine bed upon a floor, said support element being rotatably supported in relation to the machine bed and the floor; and
   at least one further said support element, said support elements being arranged crosswise on one side of the machine bed.

2. The machine of claim 1, wherein the support element is constructed in the form of rods.

3. The machine of claim 1, further comprising at least one further said support element on an opposite side of the machine bed.

4. The machine of claim 1, wherein the support elements are arranged within the machine bed.

5. The machine of claim 1, wherein the support elements are rotatably connected to the machine bed on a machine side close to a corner of the machine bed.

6. The machine of claim 1, constructed as a machine tool, a production machine or in the form of a robot.

7. A machine comprising:
   at least one machine bed; and
   two pairs of support elements for connection of the machine bed upon a floor, said support elements being rotatably supported in relation to the machine bed and the floor,
   wherein one pair of support elements is arranged crosswise on one side of the machine bed, and the other pair of support elements is arranged crosswise on an opposite side of the machine bed.

8. The machine of claim 7, wherein the support element is constructed in the form of rods.

9. The machine of claim 7, wherein the support elements are arranged within the machine bed.

10. The machine of claim 7, wherein the support elements are rotatably connected to the machine bed on a machine side close to a corner of the machine bed.

11. The machine of claim 7, constructed as a machine tool, a production machine or in the form of a robot.

12. Apparatus for supporting a machine bed upon a floor, comprising:
   a support assembly including two pairs of rods, one pair of rods positioned on one side of the machine bed, and another pair of rods positioned on an opposite side of the machine bed;
   a first pivot bearing unit for rotatably connecting one end of the support assembly to the machine bed; and
   a second pivot bearing unit for rotatably connecting another end of the support assembly to the floor,
   wherein the rods of each pair of rods are arranged crosswise.

13. The apparatus of claim 12, wherein the rods of each pair of rods are arranged within the machine bed.

14. The apparatus of claim 12, wherein the first and second pivot bearings are arranged in corner areas of the machine bed.

* * * * *